(12) United States Patent
Niiyama et al.

(10) Patent No.: US 10,890,594 B2
(45) Date of Patent: Jan. 12, 2021

(54) AUTOMATED ANALYZER

(71) Applicant: Hitachi High-Technologies Corporation, Tokyo (JP)

(72) Inventors: Yu Niiyama, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 240 days.

(21) Appl. No.: 15/577,863

(22) PCT Filed: Apr. 28, 2016

(86) PCT No.: PCT/JP2016/063307
§ 371 (c)(1),
(2) Date: Nov. 29, 2017

(87) PCT Pub. No.: WO2016/203856
PCT Pub. Date: Dec. 22, 2016

(65) Prior Publication Data
US 2018/0164336 A1 Jun. 14, 2018

(30) Foreign Application Priority Data
Jun. 17, 2015 (JP) .................. 2015-121636

(51) Int. Cl.
*G01N 35/10* (2006.01)
*G01N 35/04* (2006.01)
*G01N 35/00* (2006.01)

(52) U.S. Cl.
CPC ......... *G01N 35/1002* (2013.01); *G01N 35/00* (2013.01); *G01N 35/04* (2013.01);
(Continued)

(58) Field of Classification Search
CPC .............. G01N 35/1002; G01N 35/04; G01N 2035/00306; G01N 2035/00435;
(Continued)

(56) References Cited

U.S. PATENT DOCUMENTS

2004/0258565 A1* 12/2004 Watari ............... G01N 35/1002
422/64
2006/0204997 A1* 9/2006 Macioszek ......... G01N 35/0099
435/6.11
(Continued)

FOREIGN PATENT DOCUMENTS

JP     05-280851 A    10/1993
JP    2005-291731 A    10/2005
(Continued)

OTHER PUBLICATIONS

Extended European Search Report received in corresponding European Application No. 16811331.4 dated Jan. 21, 2019.
(Continued)

*Primary Examiner* — Benjamin R Whatley
*Assistant Examiner* — Curtis A Thompson
(74) *Attorney, Agent, or Firm* — Mattingly & Malur, PC

(57) ABSTRACT

The automated analyzer equalizes the temperature inside a reagent container storage apparatus. The automated analyzer is provided with a reagent container storage apparatus that cools a reagent container, the reagent container storage apparatus being provided with: a reagent storage chamber for storing the reagent container, the reagent storage chamber having at least one of the bottom surface and the side surface thereof cooled by a first cooling source; and a transfer member which is arranged to cover the reagent container stored in the reagent storage chamber, and which is thermally connected to the reagent storage chamber.

7 Claims, 7 Drawing Sheets

(52) U.S. Cl.
CPC .............. *G01N 2035/00306* (2013.01); *G01N 2035/00346* (2013.01); *G01N 2035/00435* (2013.01); *G01N 2035/00445* (2013.01); *G01N 2035/0443* (2013.01); *G01N 2035/0455* (2013.01)

(58) Field of Classification Search
CPC ... G01N 2035/0443; G01N 2035/0455; G01N 2035/00346; G01N 2035/00445; G01N 35/00; G01N 1/42; G01N 35/00584; G01N 35/026; G01N 2035/0094; G01N 2035/0465; G01N 35/0092; G01N 2001/1081; G01N 35/0099
See application file for complete search history.

(56) References Cited

U.S. PATENT DOCUMENTS

| | | | | |
|---|---|---|---|---|
| 2008/0072689 | A1* | 3/2008 | Muraishi | G01N 35/00 73/863.11 |
| 2012/0184025 | A1* | 7/2012 | Kawata | G01N 21/07 435/287.2 |
| 2012/0237398 | A1* | 9/2012 | Katsumi | G01N 35/00 422/68.1 |
| 2012/0329143 | A1 | 12/2012 | Yamazaki et al. | |
| 2013/0130369 | A1* | 5/2013 | Wilson | G16B 99/00 435/289.1 |
| 2017/0082647 | A1* | 3/2017 | Watanabe | G01N 35/04 |
| 2017/0128944 | A1* | 5/2017 | Cheng | B01L 3/523 |

FOREIGN PATENT DOCUMENTS

| | | | | |
|---|---|---|---|---|
| JP | 2009-139269 | A | | 6/2009 |
| JP | 2012-194071 | A | | 10/2012 |
| JP | 2013-185980 | A | | 9/2013 |
| JP | 2015-064220 | A | | 4/2015 |
| JP | 2015064220 | A | * | 4/2015 |
| JP | 2015184034 | A | * | 10/2015 ............. G01N 35/04 |

OTHER PUBLICATIONS

International Search Report of PCT/JP2016/063307 dated Jul. 26, 2016.

* cited by examiner

[FIG. 1]
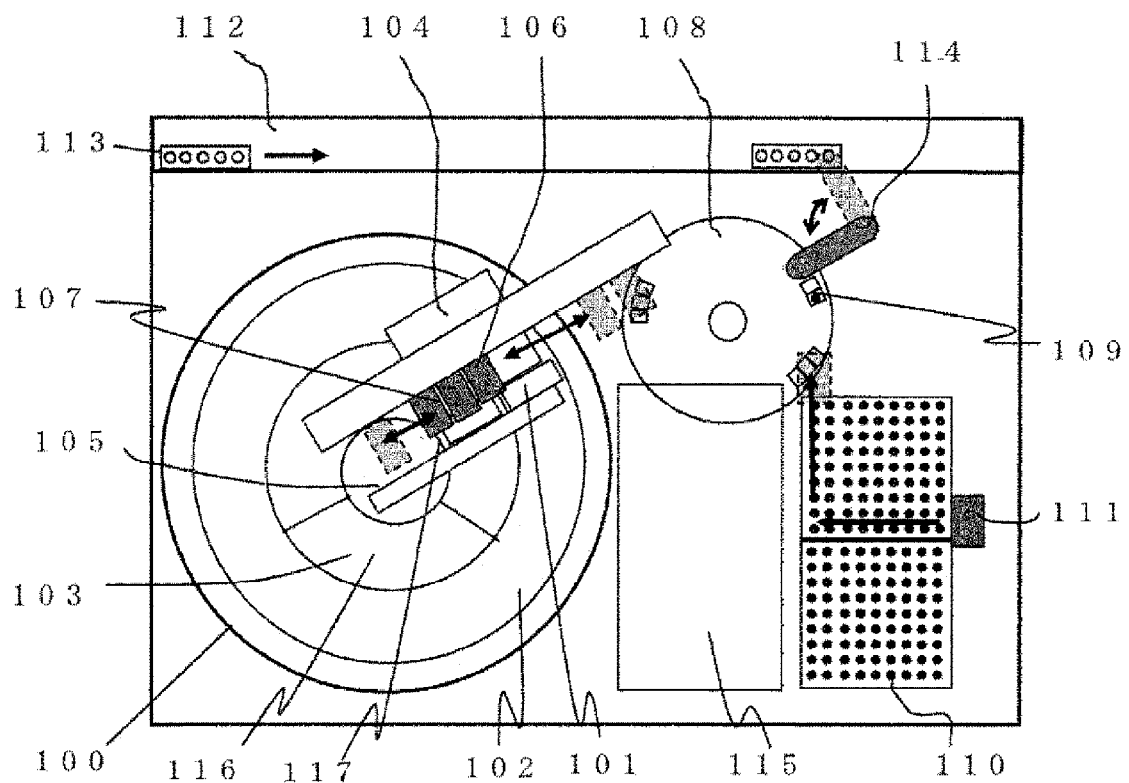

[FIG. 2]
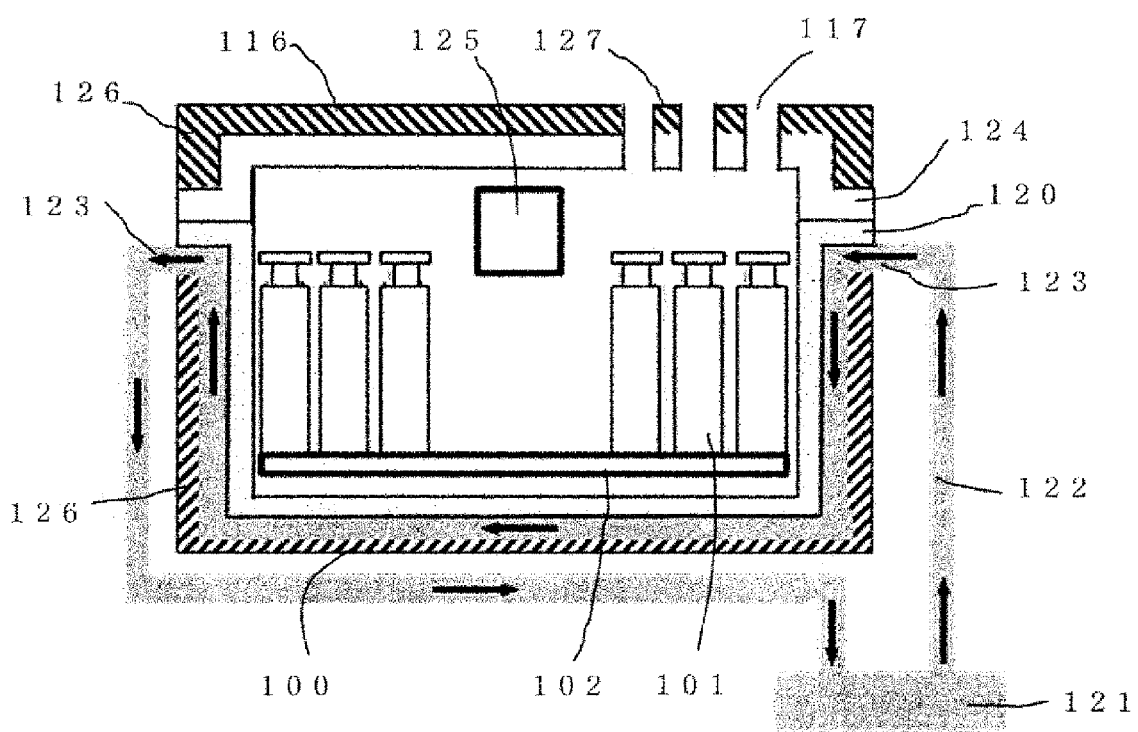

[FIG. 3]
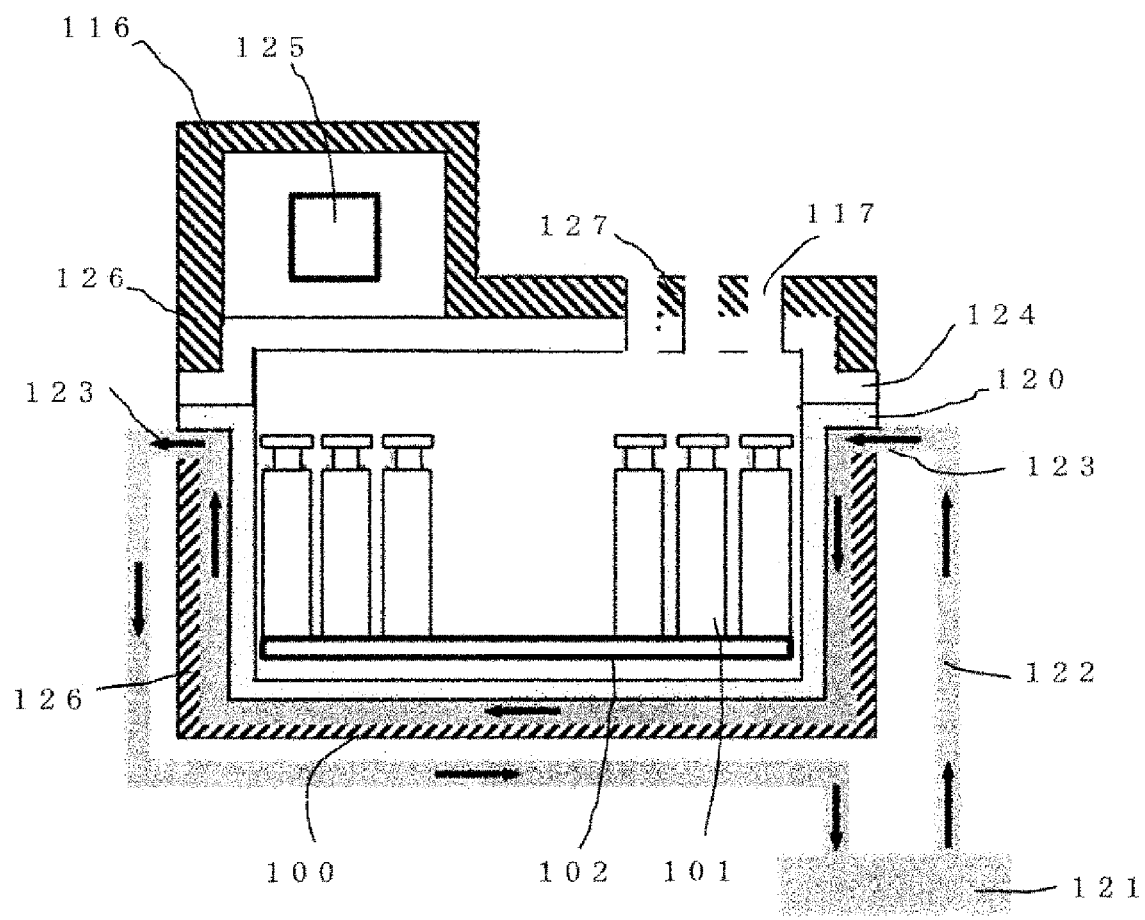

[FIG. 4]
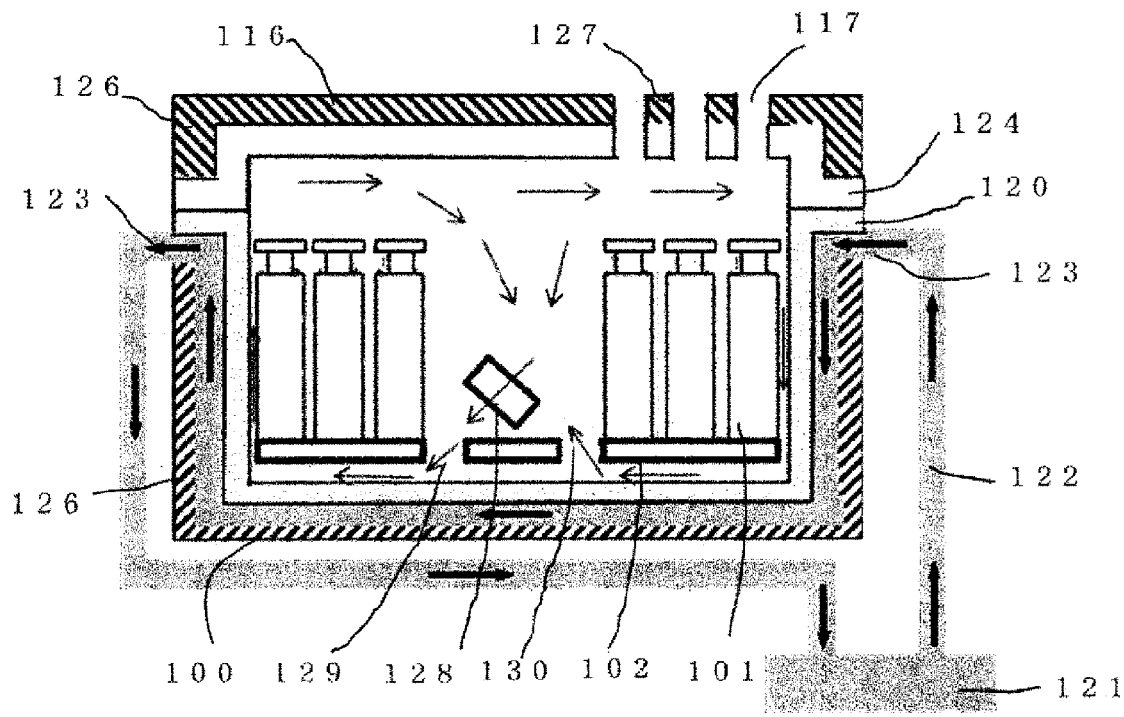
[FIG. 5]
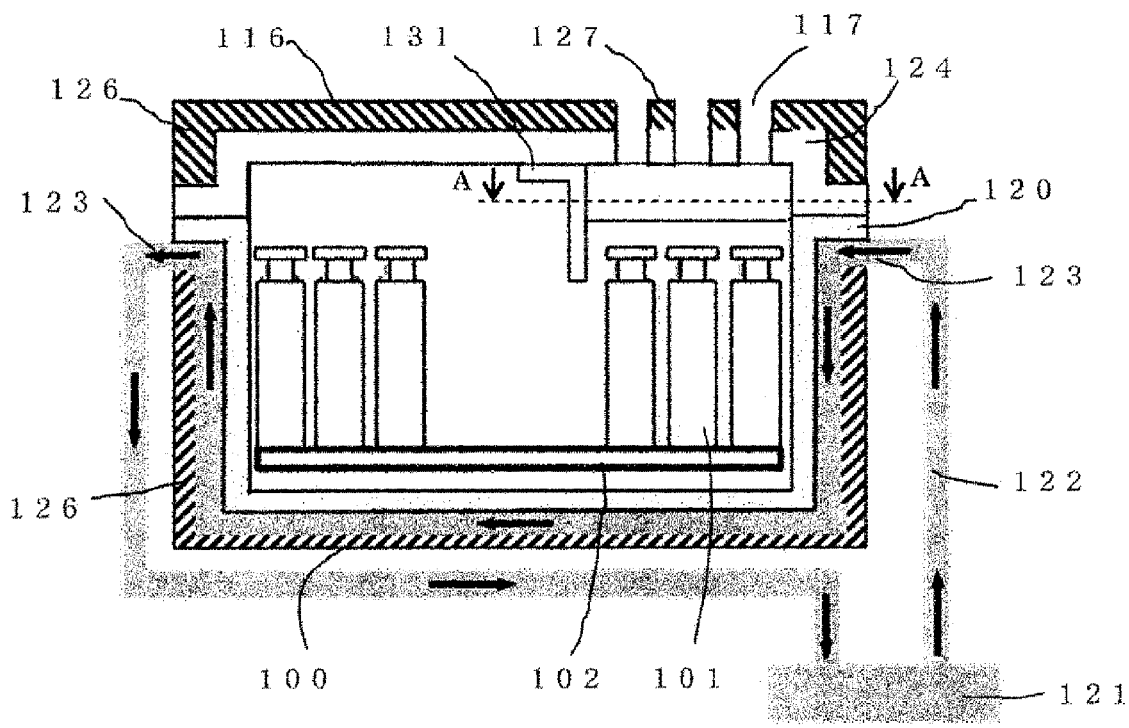

[FIG. 6]
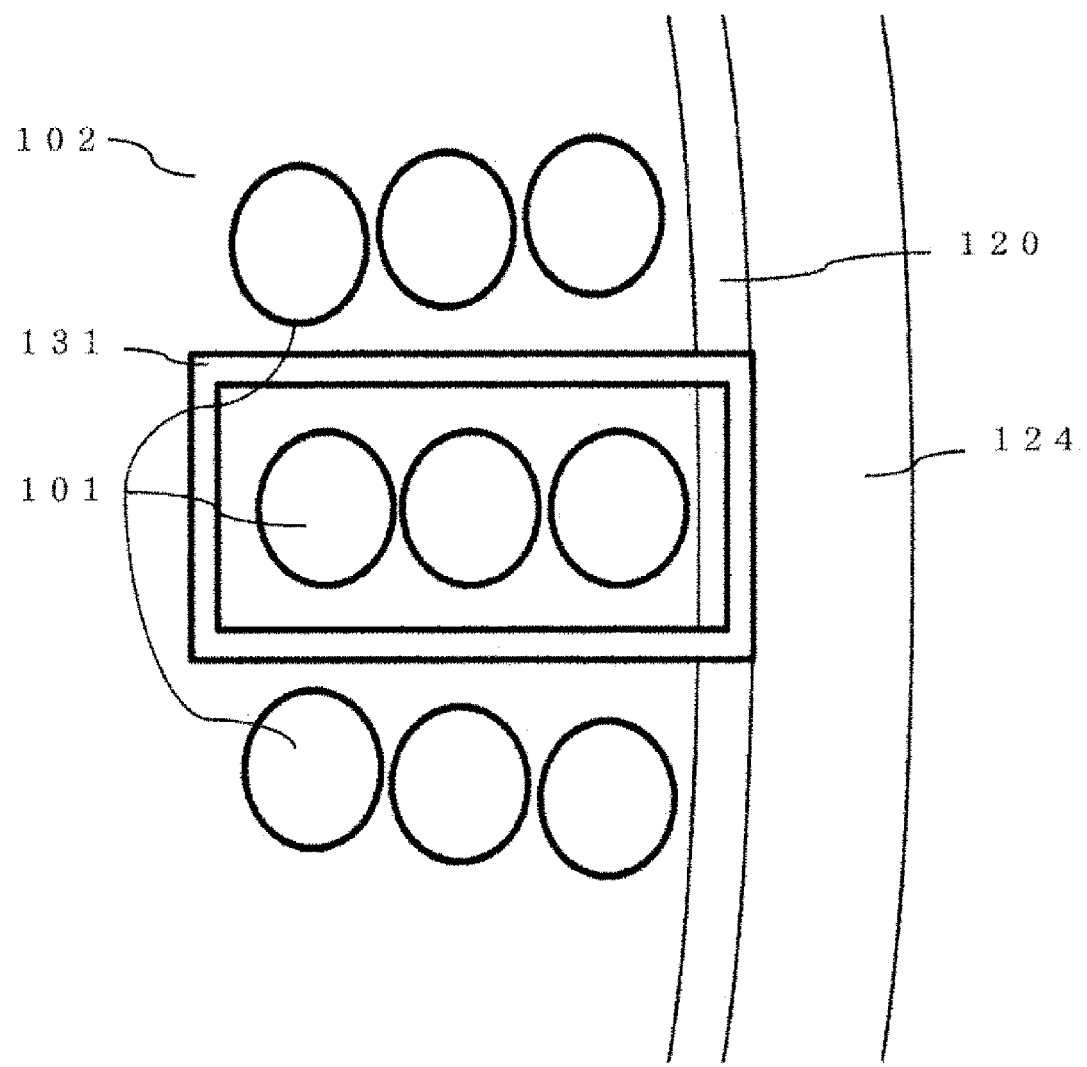

[FIG. 7]
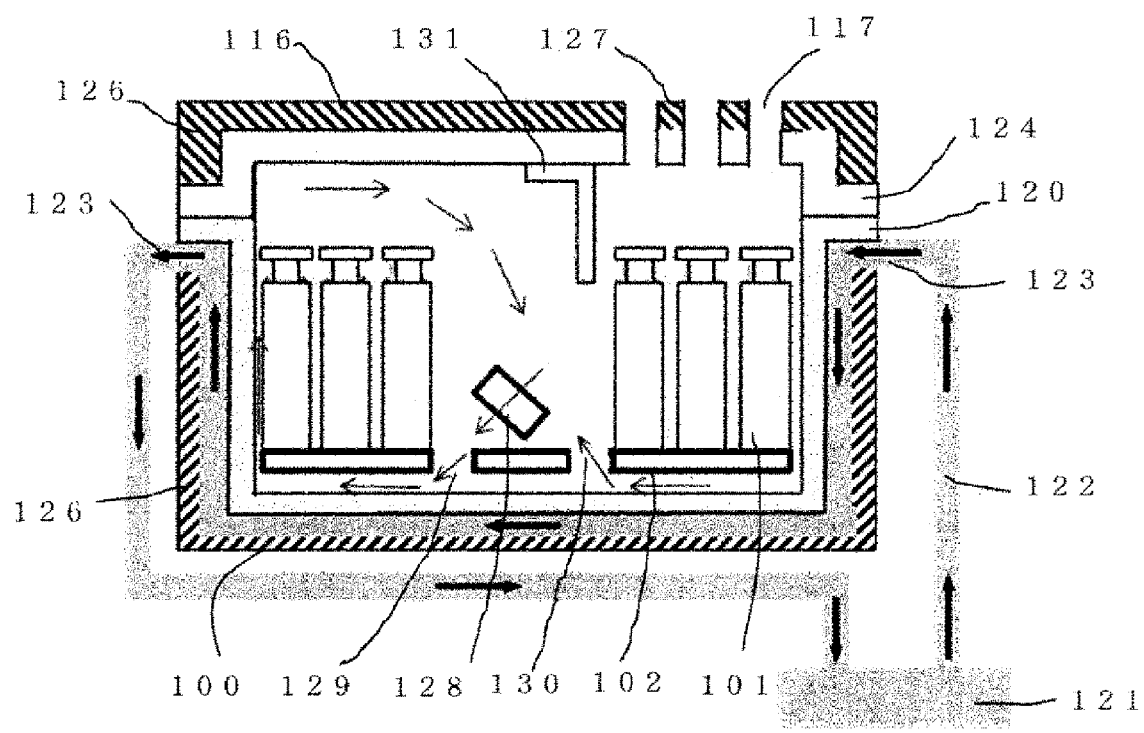

[FIG. 8]
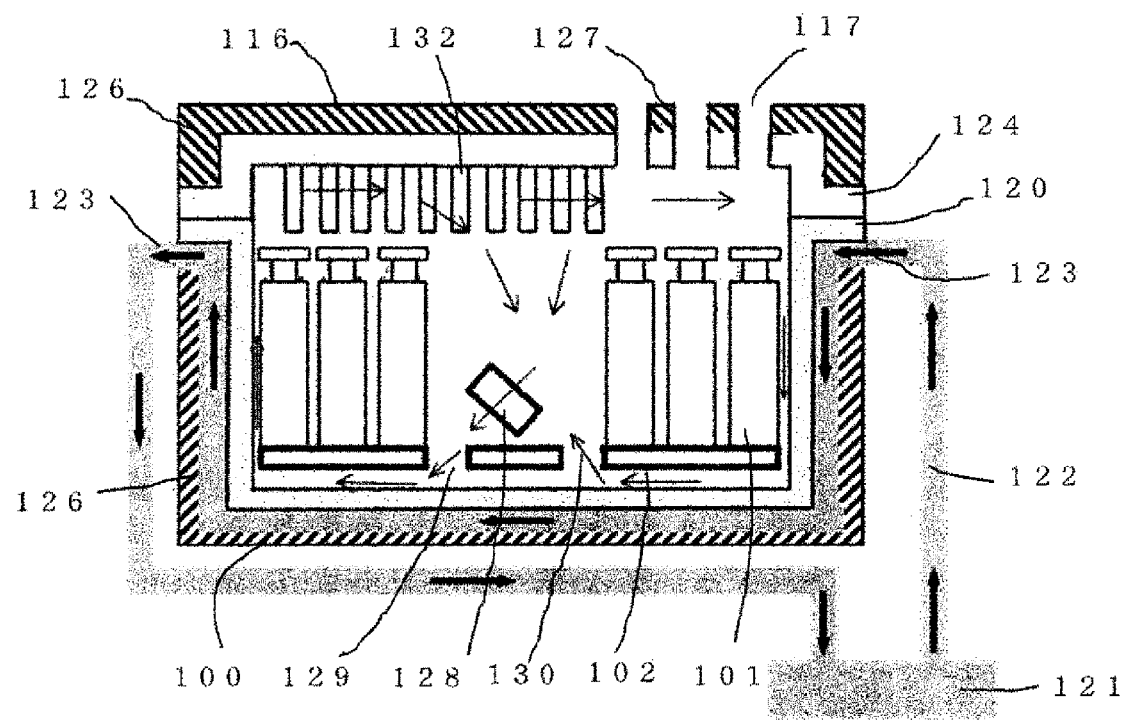

AUTOMATED ANALYZER

TECHNICAL FIELD

The present invention relates to an automated analyzer that automatically analyzes components of blood and so on, and particularly relates to a reagent container storage apparatus in the automated analyzer.

BACKGROUND ART

A specimen analyzer including a reagent storage chamber housing a reagent container and cooling the housed reagent container, which analyzes a reagent cooled inside the reagent storage chamber is known (Patent Literature 1).

The reagent storage chamber described in Patent Literature 1 includes a housing configured so that an upper part can be opened and closed. There is disclosed that a member with high thermal conductivity is provided at a lower position of an inside reagent container table and a member with lower thermal conductivity than the above member is provided at a side part of the reagent container, thereby relatively preventing generation of dew condensation at the side part of the reagent container when a lid of the housing is opened/closed, and suppressing adhesion of condensed water to the reagent container at the time of setting the reagent container in the reagent storage chamber.

CITATION LIST

Patent Literature

Patent Literature 1: JP-A-2012-194071 (U.S. Patent Application No. 2012/0237398 Specification)

SUMMARY OF INVENTION

Technical Problem

The reagent storage chamber described in Patent Literature 1 has a structure in which a side part and an upper part are not easily cooled as compared with a lower part as the member with lower thermal conductivity is used at the side part of the reagent container. Also in the analyzer having dispensing holes for dispensing a regent in the reagent container in a reagent lid, an upper space of the reagent container storage apparatus tends to easily warm up because of outside air flowing into the dispensing holes. Furthermore, an automated analyzer having a mechanism to handle the reagent container in the reagent container storage apparatus, for example, a conveying mechanism for moving the reagent container inside the reagent container table or a mechanism to open and close a lid of the reagent container has a large number of motors to be a heat source in the reagent container, warming of the upper space in the reagent container storage apparatus becomes more prominent. Even when a temperature difference is generated in the reagent container storage apparatus, it is possible to maintain reagents inside the apparatus in a fixed temperature or less by improving cooling performance, but on the other hand, costs of the apparatus are increased and use efficiency of energy is also reduced. Therefore, it is desirable to equalize the temperature inside the reagent container storage apparatus.

An object of the present invention is to provide an automated analyzer capable of reducing upper and lower the temperature difference inside a reagent container storage apparatus in the above reagent container storage apparatus.

Solution to Problem

In order to solve the above problems, a reagent container storage apparatus according to the present invention includes a reagent storage chamber for storing reagent containers, in which at least one of a bottom surface and a side surface thereof is cooled by a first cooling source, and a transfer member arranged to cover the reagent containers stored in the reagent storage chamber and thermally connected to the reagent storage chamber.

Advantageous Effects of Invention

According to the present invention, it is possible to cool the reagent containers not only from the bottom surface and the side surface of the reagent storage chamber but also from all directions uniformly, therefore, upper and lower temperature difference of reagents in the reagent containers can be reduced. As a result, it is possible to store the reagents for a long term.

Other problems, structures and advantages will be cleared by the following description of embodiments.

BRIEF DESCRIPTION OF DRAWINGS

FIG. 1 is a plan view of an automated analyzer.

FIG. 2 is a vertical cross-sectional view showing a reagent container storage apparatus according to Embodiment 1.

FIG. 3 is a vertical cross-sectional view showing the reagent container storage apparatus in a case where a drive source is arranged in an upper position and a transfer member is arranged in a lower position according to Embodiment 1.

FIG. 4 is a vertical cross-sectional view of a reagent container storage apparatus according to Embodiment 2.

FIG. 5 is a vertical cross-sectional view of a reagent container storage apparatus according to Embodiment 3.

FIG. 6 is a cross-sectional view of the reagent container storage apparatus taken along A-A line according to Embodiment 3.

FIG. 7 is a vertical cross-sectional view of a reagent container storage apparatus according to Embodiment 4.

FIG. 8 is a vertical cross-sectional view of a reagent container storage apparatus according to Embodiment 5.

DESCRIPTION OF EMBODIMENTS

Hereinafter, embodiments of the present invention will be explained in detail with reference to the drawings. An automated analyzer cited as an example in the present specification automatically executes chemical analyses such as biochemical analysis and immunity analysis in clinical examination. Though an automated analyzer using a magnetic particle reagent for analysis of a specimen is cited as an example for explanation in this case, kinds of reagents or the like are not particularly limited.

Embodiment 1

As shown in FIG. 1, a large number of reagent containers 101 arranged in a reagent container storage apparatus 100 are set on a circumference on a reagent disk 102 as a conveying device (a reagent lid is not shown). In the vicinity of the reagent container storage apparatus 100, a carrying-in/carrying-out mechanism 103, a lid opening/closing mechanism 104, a moving mechanism 105, a reagent dispensing mechanism 106, a magnetic particle stirring mechanism 107 and the like are arranged.

A reaction container holder 108 holds a disposable reaction container 109 in which a sample reacts with a reagent to be detachable. The reaction container holder 108 can be rotated as well as can control temperature. A reaction container supply chamber 110 is for constantly storing the reaction containers 109. A reaction container transfer mechanism 111 is a moving mechanism in X-Y-Z directions for transferring the reaction container 109 from the reaction container supply chamber 110 to the reaction container holder 108.

A sample container conveying mechanism 112 is a conveying mechanism including a line for conveying sample containers 113 containing samples. A sample carried by the sample container conveying mechanism 112 is dispensed into reaction containers on the reaction container holder 108 by a sample dispensing mechanism 114. A reagent dispensing mechanism 106 includes a moving mechanism (not shown) in horizontal and vertical directions, dispensing a reagent into reaction containers. A reaction state of the specimen and the reagent is measured by a reaction measurement device 115. A power supply, a controller, an operation unit, a temperature controller, a pump and so on are included, though not shown.

Here, the outline of analysis operation will be explained. The reagent container 101 mounted on the carrying-in/carrying-out mechanism 103 is moved to the reagent disk 102 by the moving mechanism 105. Next, the reagent disk 102 is rotationally moved, and the reagent container 101 is moved to a reagent dispensing position by this rotational movement. A lid of the reagent container 101 moved to the reagent dispensing position is opened/closed by the lid opening/closing mechanism 104. Next, a reagent inside the reagent container 101 is dispensed into the reaction container 109 transferred to the reaction container holder 108 by the reagent dispensing mechanism 106. The reagent to be dispensed is cooled by the reagent container storage apparatus 100.

Next, the sample is dispensed into the reaction container 109 by the sample dispensing mechanism 114, which is stirred by a stirring mechanism (not shown). After the stirring, the reaction container 109 is left on the reaction container holder 108 for a certain period of time.

The reagent container 101 is moved to an inner periphery storage unit 119 in the reagent container storage apparatus 100 by the moving mechanism 105, and the lid of the reagent container 101 moved to the inner periphery storage unit 119 is opened/closed by the lid opening/closing mechanism 104.

After magnetic particles inside the reagent container 101 is stirred by the magnetic particle stirring mechanism 107, the reagent container 101 is moved onto the reagent disk 102 by the moving mechanism 105. The magnetic particles inside the reagent container 101 are dispensed into the reaction container 109 by the reagent dispensing mechanism 106. After the stirring by the stirring mechanism (not shown), the reaction container 109 is left on the reaction container holder 108 for a certain period of time. A reaction state of the specimen and the reagent is measured by the reaction measurement device 115.

Next, a structure of the reagent container storage apparatus 100 according to the embodiment will be explained in detail. FIG. 2 shows a vertical cross-sectional view of the reagent container storage apparatus 100 according to the embodiment. The reagent container storage apparatus 100 mainly includes a reagent storage chamber 120 storing the reagent containers 101 and a reagent lid 116. A side surface and a bottom surface of the reagent storage chamber 120 is made of metal such as SUS. As the side surface and the bottom surface are made of metal, thermal conductivity is higher than a resin material, therefore, the reagent container storage apparatus 100 can be efficiently cooled. A cold water pipe 123 for introducing cold water 122 is provided on the side surface or the bottom surface of the reagent storage chamber 120. In the case where the cold water pipe is provided on the side surface, it is desirable that the pipe is provided at a position as upper as possible for filling the pipe with the cold water 122 to the upper position of the side surface. The cold water pipe 123 is connected to a cooler 121 as a primary cooling source. As a cooling medium, the cold water 122 can be cited as one example. When the cold water 122 is used, the side surface and the bottom surface of the reagent storage chamber 120 have a hollow structure, which performs cooling by filling the inside with the cold water 122. An outside surface of the reagent storage chamber 120 is formed of a material with a low thermal conductivity (for example, styrene foam). Accordingly, thermal effects received from outside air are reduced to thereby improve cooling efficiency.

The reagent disk 102 for storing the reagent containers 101 is provided inside the reagent container storage apparatus 100, and a large number of reagent containers 101 can be stored thereinside. The reagent disk 102 is fixed to a central axis of the reagent container storage apparatus 100, which can be rotated by a drive source such as a motor (a drive mechanism and a rotation mechanism are not shown). The reagent lid 116 is fixed to the reagent storage chamber 120 or a surrounding fixation portion, and a gap between the reagent lid 116 and the reagent storage chamber 120 is sealed with a packing material.

The reagent container storage apparatus 100 according to the embodiment includes the moving mechanism 105 for moving the reagent container 101 to the inside of the reagent container storage apparatus 100 and the lid opening/closing mechanism 104 for opening and closing the lid of the reagent container 101. Therefore, the inside, particularly in an upper space of the reagent container storage apparatus 100 is warmed due to effects of outside air flowing from dispensing holes 117 of the reagent container storage apparatus 100 as well as effects of the heat source (motor or the like) for driving the mechanisms inside the reagent container storage apparatus 100, which makes difficult to cool reagents inside the reagent containers 101 uniformly.

In response to the above, an inner wall 124 made of a heat transfer material connected to the reagent storage chamber 120 is provided above the reagent containers 101 in the present embodiment to solve the problem. It is desirable that the inner wall 124 is formed of materials having higher thermal conductivity than the reagent storage chamber 120 and having lower rigidity than the material forming the reagent storage chamber 120, which are, for example, aluminum, copper and so on. A connection portion between the reagent storage chamber 120 and the inner wall 124 is provided in a flange portion of the reagent storage chamber 120. For example, the connection between the reagent 120 and the inner wall 124 is performed by being screwed to taps provided in the flange portion. As the member made of the material having lower rigidity than the fixation portion (flange portion) is used for the inner wall 124, it is possible to fix the member with increased adhesion. Moreover, the reagent storage chamber 120 and the member connected above (the inner wall 124) are formed as separate components, therefore, they are removable and the access to the reagent containers 101 and mechanisms inside the reagent container storage apparatus 100 becomes easy. It is desirable that the area of the connection portion is large for transferring heat more efficiently. A structure in which thermal conductive grease or a thermal conductive sheet is interposed between the reagent storage chamber 120 and the inner wall 124 (not shown) may be adopted.

The inner wall 124 preferably has a shape covering all areas above a space where the reagent containers 101 exist. According to such shape, the reagent containers 101 can be cooled from all directions of 360 degrees, and all reagent containers 101 can be cooled uniformly. It is preferable that a distance between the inner wall 124 and the reagent container 101 is as narrow as possible, and heat exchange between the inner wall 124 and the reagent containers 101 can be promoted by reducing the distance. In a case where a drive source (heat source) 125 is included inside the reagent container storage apparatus 100, if a structure in which the drive source 125 is positioned at an upper position and the inner wall 124 is arranged at a lower position, upper and lower positional relationship with respect to the drive source (heat source 125) is preferably as described above (FIG. 3). According to the arrangement, effects from the drive source (heat source) 125 can be reduced by the inner wall 124 and upper and lower temperature difference can be generated inside the reagent container storage apparatus 100. Accordingly, it is possible to thermally separate the inside into a lower space where the reagent is desired to be cooled and an upper space for performing driving, and reagents inside the reagent containers 101 can be cooled to a lower temperature at an approximately 8 degrees even in the automated analyzer having the reagent container storage apparatus 100 having many drive sources (heat sources) 125.

It is also preferable to have the reagent lid 116 above the inner wall 124. More specifically, the inner wall 124 may be provided inside the reagent lid 116. In this case, a portion between the inner wall 124 and the reagent lid 116 is a heat insulating member 126 with a low thermal conductivity (for example, styrene foam), and it is possible to suppress generation of dew condensation on the outside surface of the reagent lid 116 by adopting the structure.

It is desirable to increase a height of the heat insulating member 126 in the reagent lid 116 near the dispensing holes 117 for preventing generation of dew condensation on the outside surface and on the inner wall 124, however, in a structure where it is difficult to take the heat insulating member 126 to be large, it is possible to prevent generation of dew condensation by providing a heater 127 inside the reagent lid 116. In the case of providing the heater 127, it is also possible to adopt a structure in which the inner wall 124 is not formed just below the heater 127 for preventing temperature increase in the inner wall 124.

Embodiment 2

Next, another embodiment of the reagent storage apparatus 100 will be explained with reference to FIG. 4. In the present embodiment, an example in which a blower 128 such as a fan for circulating air inside the reagent container storage apparatus 100 is provided in the reagent container storage apparatus 100 having the inner wall 124 is shown. Explanation concerning the same portions as Embodiment 1 is omitted.

FIG. 4 shows a vertical cross-sectional view of the reagent container storage apparatus 100 having the blower 128. It is preferable that the blower 128 is installed with an inclination within a range of 0<X<90° with respect to the bottom surface of the reagent storage chamber 120 to send air to the bottom surface. According to the structure, air blowing to the bottom surface goes from the bottom surface to the side surface and air reaching the side surface blows up from the side surface to an upper surface, then, the blown-up air abuts on the inner wall 124 above the reagent containers 101 and circulates around the inside of the reagent container storage apparatus 100. Accordingly, it is possible to circulate cooled air through the bottom surface, the side surface and the inner wall 124 of the reagent storage chamber 120, heat exchange with respect to the reagents inside the reagent containers 101 is promoted and the upper and lower temperature difference inside the reagent container storage apparatus 100 is reduced, thereby cooling the reagents inside the reagent containers 101 uniformly as a whole. The arrangement of the blower 128 is not limited to the position along the central axis of the reagent disk 102 as long as the blower 128 can be installed at a position directed to the bottom surface. However, it is desirable to arrange the blower 128 at a position distant from the dispensing holes 117 in a point that effects of outside air infiltration from the dispensing holes 117 are reduced. The shape of the reagent disk 102 storing the reagent containers 101 preferably has a structure in which holes are provided in the vicinity of a blow-out port 129 and a suction port 130 of the blower 128 in order to allow air from the blower 128 to blow to the bottom surface and to suck air on the bottom surface.

Embodiment 3

Next, further another embodiment of the reagent storage apparatus 100 will be explained with reference to FIG. 5 and FIG. 6. In the present embodiment, an example in which a member (hereinafter, a shielding plate 131) that shields the reagent container storage apparatus 100 including the inner wall 124 from outside air infiltration through the dispensing holes 117 is shown. Explanation concerning the same portions as Embodiment 1 and Embodiment 2 is omitted.

The shielding plate 131 shown in FIG. 5 is fixed to the reagent lid 116 or the inner wall 124, and is arranged so as to surround the vicinity of the dispensing holes 117 (an A-A cross-sectional view is shown in FIG. 6), thereby cooling outside air flowing from the dispensing holes 117 and promoting cooling of the inside of the reagent container storage apparatus 100.

Embodiment 4

Next, further another embodiment of the reagent storage apparatus 100 will be explained with reference to FIG. 7. In the present invention, an example in which the member (shielding plate 131) that shields the reagent container storage apparatus 100 from outside air infiltration through the dispensing holes 117 is provided between the dispensing holes 117 of the reagent lid 116 and the blower 128 in the structure including the inner wall 124 and the blower 128 is shown. That is, an example in which Embodiments 1 to 3 are combined is shown. Explanation concerning the same portions as Embodiments 1 to 3 is omitted.

In FIG. 7, the shielding plate 131 is fixed to the reagent lid 116 or the inner wall 124. Therefore, the shielding plate 131 is thermally connected to the inner wall 124 and has almost the same temperature as the inner wall 124. As the shielding plate 131 is arranged in a passage for outside air flowing from the dispensing holes 117, outside air flowing into the reagent storage apparatus 100 can be efficiently cooled by the shielding plate 131, as a result, cooling inside the reagent container storage apparatus 100 can be promoted. Furthermore, air flowing in an upper part is cooled by the shielding plate 131 before the air infiltrates again by the blower 128, thereby further promoting cooling.

Embodiment 5

Next, further another embodiment of the reagent storage apparatus 100 will be explained with reference to FIG. 8. In the present invention, an example in which projections (a heat sink 132) connected to the inner wall 124 are provided on a back surface (inside the reagent container storage apparatus 100) of the inner wall 124 in the structure including the inner wall 124 and the blower 128 is shown. Explanation concerning the same portions as Embodiments 1 to 4 is omitted.

One heat sink 132 or plural heat sinks 132 may be provided. The heat sink 132 is thermally connected to the inner wall 124 and has almost the same temperature as the inner wall 124. According to the present embodiment, air circulated by the blower 128 is cooled by the heat sink 132, therefore, the inside of the reagent storage apparatus 100 can be cooled more efficiently.

According to the structures described in the above Embodiments 1 to 5, the reagents inside the reagent containers 101 can be uniformly cooled in the present invention.

The present invention is not limited to the above embodiments and various modification examples are included. For example, the above embodiments have been explained in detail for clearly explaining the present invention, and the present invention is not always limited to one including all explained structures. Part of the structure of a certain embodiment may be replaced with the structure of another embodiment as well as the structure of a certain embodiment may be added to the structure of another embodiment. It is also possible to perform addition, deletion and replacement of part of structures of respective embodiment with respect to structures of other embodiments.

REFERENCE SIGNS LIST

100: reagent container storage apparatus, 101: reagent container, 102: reagent disk, 103: carrying-in/carrying-out mechanism, 104: a lid opening/closing mechanism, 105: a moving mechanism, 106: reagent dispensing mechanism, 107: magnetic particle stirring mechanism, 108: reaction container holder, 109: reaction container, 110: reaction container supply chamber, 111: reaction container transfer mechanism, 112: sample container conveying mechanism, 113: sample container, 114: sample dispensing mechanism, 115: reaction measurement device, 116: reagent chamber lid, 117: dispensing hole, 118: carrying-in/carrying-out unit, 119: inner periphery storage unit, 120: reagent storage chamber, 121: cooler, 122: cold water, 123: cold water pipe, 124: inner wall, 125: drive source (heat source), 126: heat insulating member, 127: heater, 128: blower, 129: blow-out port, 130: suction port, 131: shielding member, 132: heat sink

The invention claimed is:

1. An automated analyzer comprising:
   a reagent container storage apparatus that cools reagent containers,
   wherein the reagent container storage apparatus includes:
   a reagent storage chamber for storing reagent containers, in which a bottom surface and a side surface thereof is cooled by a first cooling source,
   a reagent chamber lid covering the reagent storage chamber,
   an inner wall made of a heat transfer material arranged inside the reagent chamber lid so as to cover the reagent containers stored in the reagent storage chamber and thermally connected to the reagent storage chamber, the reagent chamber lid and the inner wall include a plurality of dispensing holes communicating between inside and outside of the reagent container storage apparatus, and
   a shielding arranged inside the reagent chamber lid, the shielding member physically and thermally connected to the inner wall and extending vertically from the inner wall toward the bottom surface of the reagent storage chamber, the shielding member surrounding a vicinity of the plurality of dispensing holes and shielding the reagent container storage apparatus from outside air flowing through the dispensing holes and also cooling the outside air.

2. The automated analyzer according to claim 1, wherein a heat insulating member is provided between the reagent chamber lid and the inner wall.

3. The automated analyzer according to claim 1, wherein the inner wall has lower rigidity and higher thermal conductivity than a member forming the bottom surface and the side surface of the reagent storage chamber.

4. The automated analyzer according to claim 1, wherein the reagent container storage apparatus includes a blower for circulating air inside the reagent container storage apparatus, and
   the blower is configured to blow air from a direction inclined within a range of 0<X<90° with respect to the bottom surface of the reagent storage chamber.

5. The automated analyzer according to claim 4, wherein the shielding member is arranged between the dispensing holes and the blower.

6. The automated analyzer according to claim 1, wherein the inner wall includes a heat sink that is thermally connected to the inner wall and installed in the inner on a surface of the inner wall inside the reagent storage chamber.

7. The automated analyzer according to claim 1, further comprising:
   a drive source,
   wherein the drive source is arranged above the inner wall.

* * * * *